April 8, 1930.  H. W. LORMOR  1,753,933
METHOD AND MEANS FOR UNLOADING ARTICLE CARRIERS
Filed Feb. 2, 1929  2 Sheets-Sheet 1

Inventor
Henry W. Lormor.
Kwis Hudson & Kent
Attys

April 8, 1930.  H. W. LORMOR  1,753,933
METHOD AND MEANS FOR UNLOADING ARTICLE CARRIERS
Filed Feb. 2, 1929  2 Sheets-Sheet 2
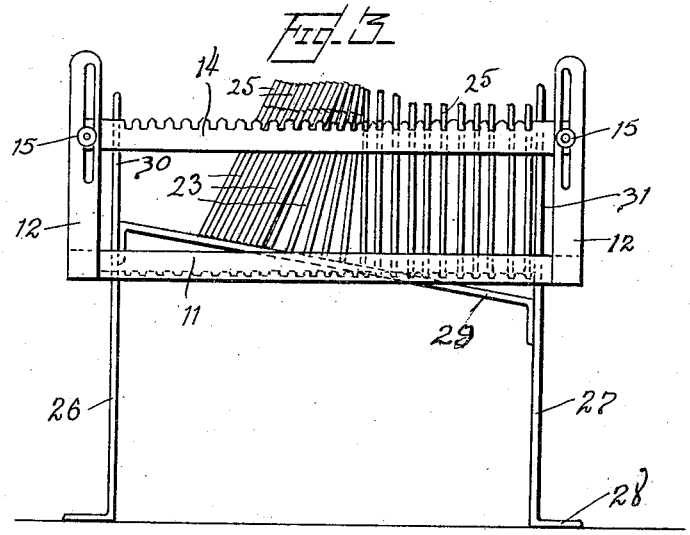
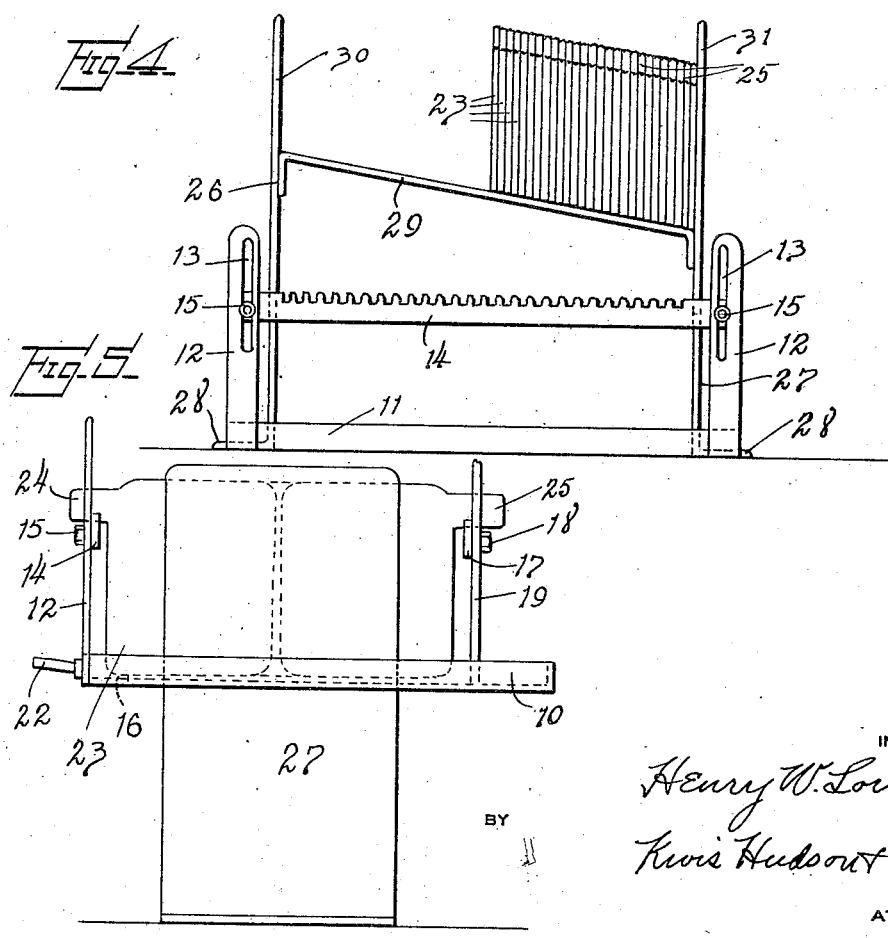
INVENTOR
Henry W. Lormor.
BY
Kwis Hudson & Kent
ATTORNEYS Patented Apr. 8, 1930

1,753,933

UNITED STATES PATENT OFFICE

HENRY W. LORMOR, OF CLEVELAND HEIGHTS, OHIO, ASSIGNOR TO WILLARD STORAGE BATTERY COMPANY, OF CLEVELAND, OHIO, A CORPORATION OF WEST VIRGINIA

METHOD AND MEANS FOR UNLOADING ARTICLE CARRIERS

Application filed February 2, 1929. Serial No. 337,108.

This invention relates to a method and means for unloading article carriers, being intended primarily for use in unloading storage battery plates from drying racks or carriers in which they are vertically supported in spaced relation.

The removal of plates from such carriers by hand, as has been the practice heretofore, is a rather laborious slow process, but the removal of all of the plates from a carrier can be performed at once by the use of my invention and in a very short space of time. While especially adapted for use in the connection stated, the invention will undoubtedly be found to be of value in other arts where articles are hung in or supported upon the peripheral portions of an open bottomed carrier.

One of the objects of the invention therefore is the provision of a method for quickly and effectively unloading an entire carrier at one time.

Another object is the provision of a special piece of apparatus, called an unloading rack, to be employed in connection with the said method.

Other objects and features of novelty will appear as I proceed with a description of that embodiment of the invention which, for the purposes of the present application I have illustrated in the accompanying drawings, in which Figure 1 is a plan view of an unloading rack with a carrier for storage battery plates shown in operative relation therewith.

Fig. 3 is a view similar to Fig. 2, but with about half of the plates engaged by the unloading rack.

Fig. 4 is a further side elevational view with the carrier resting on the feet of the unloading rack and all of the plates supported by the rack in their stacked position, and Fig. 5 is an end elevational view of the parts as illustrated in Fig. 2, showing a twin battery plate in place thereon.

Figure 1:
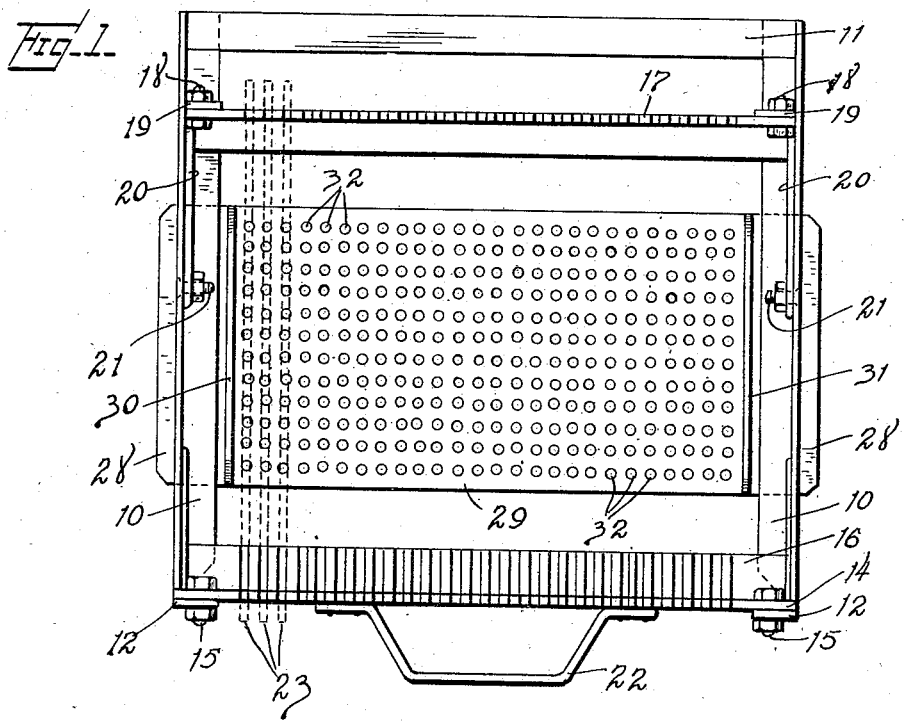
Figure 2:
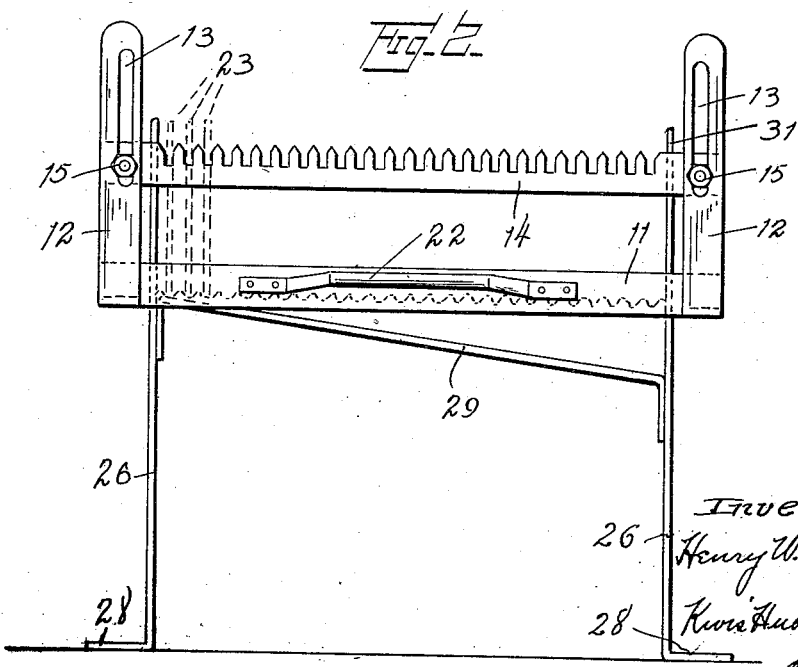
Fig. 2 is an elevational view, the carrier being illustrated in a position where the plates are just about to begin coming into engagement with the unloading rack.

In the drawings I have illustrated my invention as applied to the removal of storage battery plates from a carrier such as is commonly used in the handling of plates during the drying operation. The carrier in the present instance comprises a hollow base frame built preferably of angle iron, this frame including end bars 10 and side bars 11. Attached to each of the forward corners of the frame is a post 12 having a vertical slot 13 therein. A horizontal flat bar 14 is adjustably supported by means of bolts 15 working in the slots 13. The upper edge of the bar 14 is formed with a series of serrations to provide spaced sockets for the plate arms. Upon the horizontal flange of the bar 11 there is mounted a plate 16 having corrugations in its upper face, the low points in these corrugations being arranged in alignment with the vertical sockets in the bar 14 in order that the plates may be maintained in equally spaced vertical positions. A second supporting bar for the opposite arms of the plates is shown at 17. This bar is provided with serrations similar to those in bar 14 and may be made adjustable by means of bolts 18 working in slots in vertical end parts 19 which are carried upon horizontal plates 20 that are adjustable along the frame bars 10, being adapted to be held in any desired position thereon by bolts 21. A handle 22 is mounted upon the bar 11 for convenience in moving the carrier over any flat surface upon which it may be supported.

The carrier per se does not constitute any part of the present invention, but a somewhat detailed description of the carrier as above is essential to a full understanding of the invention. In Fig. 5 I have illustrated a twin plate 23 positioned in the carrier, the arms 24 and 25 of the plate engaging in corresponding serrations of the bars 14 and 17 respectively.

The unloading rack comprises two end pieces or legs 26 and 27, formed of heavy sheet metal with flanges 28 at their lower ends forming feet for the rack. These end pieces or legs may be conveniently made identical in size and shape. 29 is an inclined table having down turned end flanges that are welded or otherwise secured to the end pieces 26 and 27 at points intermediate the extremities of the latter, so that vertical end walls 30 and 31 are provided above the table top, the wall 31 at the lower end of the table being important as it constitutes a stop against which the plates are stacked, as will presently appear. The table 29 is preferably supplied with perforations 32, more or less closely spaced over the entire surface thereof in order that any material coming loose from the articles carried, as for instance particles of paste in the case of storage battery plates, may fall through the table and not interfere with the close stacking of the articles.

In carrying into operation the method of the present invention, the loaded plate carrier is lifted by the operator or by any suitable mechanical means into position directly above the unloading rack, or if preferred the carrier may be supported at its ends and the unloading rack brought into position beneath the carrier. The length and width of the unloading rack being less than the corresponding inner dimensions of the carrier, as illustrated in Fig. 1, relative vertical movement may take place between the two, and this may be accomplished either by lowering the carrier or raising the unloading rack, or both. When this relative movement has progressed sufficiently the high end of the table 29 contacts with the lower edge of a plate 23 at one end of the rack. Continued motion in the same direction carries this plate out of its corrugations in the supporting plate 16 and later disengages its arms 24 and 25 from the sockets in the bars 14 and 17. As soon as the plate is thus free entirely from the carrier its upper edge inclines towards the right and rests against the next succeeding plate. The first plate released naturally does not balance itself but must incline towards one side or the other in order to reach a stable position. The direction of this inclination can be readily controlled by the operator in his handling of the carrier during the lowering thereof. After the first plate is thus inclined all succeeding plates will incline in the same direction because of the weight of the preceding ones, and they will take positions somewhat as indicated in Fig. 3 when the carrier has been lowered sufficiently to disengage about half the plates. When the carrier has been lowered further sufficiently to disengage all of the plates, they all rest in inclined position, the upper edge of the last plate being against the wall 31 of the rack. The lowering of the carrier is then continued to the position shown in Fig. 4, where it rests upon the feet 28 of the rack and may be released by the operator. The operator now grasps one or more of the plates at the upper end of the table and pulls them all downwardly, gradually straightening them up and moving them into vertical positions in contact with each other and with the wall 31, as illustrated in Fig. 4, thus forming what may be termed a stack. The plates can now be lifted out of the unloading rack in one or more operations. Thereafter the plate carrier is raised above the unloading rack and is ready to be reloaded, while the rack is ready to serve for the unloading of the next loaded carrier.

Various changes and modifications in the specific apparatus herein illustrated and described may be resorted to without departing from the spirit of the invention and therefore, I desire it to be understood that the detailed disclosure herein is merely for the purpose of illustrating the invention and is not to be construed as amounting to a limitation of its scope.

Having thus described my invention, what I claim is:

1. The method of transferring spaced articles from a carrier element to an unloading rack element, one of said elements being open from top to bottom and large enough in plan dimensions to enable the other element to be telescoped within it, positioning said carrier over said rack, said rack having an article engaging surface inclined transversely to the articles in the rack, and moving said carrier and rack relatively to each other in a vertical direction so as to cause them to telescope one within the other, whereby the articles are disengaged one at a time from said carrier and supported on said rack.

2. The method of transferring spaced articles from a carrier element to an unloading rack element, one of said elements being open from top to bottom and large enough in plan dimensions to enable the other element to be telescoped within it, positioning said carrier over said rack, said rack having an article engaging surface inclined transversely to the articles in the rack, moving said carrier and rack relatively to each other in a vertical direction so as to cause them to telescope one within the other, whereby the articles are disengaged one at a time from said carrier and supported on said rack, and sliding the articles upon the said inclined surface of the rack until they assume a stacked position at the lower end thereof.

3. A method of transferring spaced articles from a carrier element to an unloading rack element, one of said elements being open from top to bottom and large enough in plan dimensions to enable the other element to be telescoped within it, positioning said carrier over said rack, said rack having an article engaging surface inclined transversely to the articles in the rack, moving said carrier and rack relatively to each other in a vertical direction so as to cause them to telescope one within the other, whereby the articles are disengaged one at a time from said carrier and supported on said rack, sliding the articles upon the said inclined surface of the rack until they assume a stacked position at the lower end thereof, removing said stack, and then moving said carrier and rack relatively to separate them.

4. A method of unloading spaced articles from an open bottomed carrier, comprising arranging said carrier over an unloading rack of smaller plan dimensions, moving said rack and carrier relatively in a vertical direction toward each other, said unloading rack having a table inclined transversely to the articles in the carrier, whereby the articles are disengaged one at a time from said carrier and supported upon said table, sliding the articles upon said inclined table until they assume a stacked position at the lower end thereof, removing said stack, and then removing said carrier.

5. A method of unloading onto an unloading rack element flat articles supported in spaced vertical position in a carrier element, one of said elements being open from top to bottom and large enough in plan dimensions to enable the other element to be telescoped within it, positioning said carrier over said rack, one of said elements having an article supporting surface inclined to the horizontal and transversely to the planes of said articles, producing relative vertical movement between said elements to cause said articles to be disengaged one at a time from said carrier and to be supported by said rack, causing the first article disengaged to incline so as to have its upper edge rest against the next adjacent article, whereby upon the continued telescoping movement of said elements and the disengagement of the articles one after another, each article disengaged inclines itself in the same direction, sliding the articles upon the rack toward one end of the latter and bringing them into vertical stacked position, removing said stack, and then moving said rack and carrier relatively to separate them.

6. A method of unloading flat articles supported in spaced vertical positions in an open bottomed carrier element, comprising positioning said carrier over an unloading rack element of smaller plan dimensions, moving said two elements relatively toward each other, one of said elements having an article supporting surface sloping downwardly in a direction transverse to the plane of said articles, said rack having an upright at one extremity thereof, whereby the articles are disengaged one at a time from said carrier and supported upon said rack, sliding the articles upon said rack until they assume a stacked position against said upright, removing the stack, and then removing said carrier.

7. An unloading rack for the removal of spaced articles from an open bottomed carrier, comprising legs and a table supported thereon sloping downwardly from one end to the other, the plan dimensions of the rack being smaller than the inside plan dimensions of said carrier, whereby the carrier may be lowered over the rack, and an upright at the lower end of the table adapted to act as a stop against which the articles may be stacked.

In testimony whereof, I hereunto affix my signature.

HENRY W. LORMOR.